United States Patent
Muto et al.

(10) Patent No.: US 9,443,643 B2
(45) Date of Patent: Sep. 13, 2016

(54) INSULATED WIRE, ELECTRICAL EQUIPMENT, AND METHOD OF PRODUCING AN INSULATED WIRE

(71) Applicants: FURUKAWA ELECTRIC CO., LTD., Tokyo (JP); FURUKAWA MAGNET WIRE CO., LTD., Tokyo (JP)

(72) Inventors: Daisuke Muto, Tokyo (JP); Makoto Oya, Tokyo (JP); Satoshi Naka, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 14/459,856

(22) Filed: Aug. 14, 2014

(65) Prior Publication Data

US 2015/0034360 A1  Feb. 5, 2015

Related U.S. Application Data

(63) Continuation of application No. PCT/JP2013/056170, filed on Mar. 6, 2013.

(30) Foreign Application Priority Data

Mar. 7, 2012 (JP) ................................. 2012-051037

(51) Int. Cl.
*H01B 13/06* (2006.01)
*H01B 7/02* (2006.01)
(Continued)

(52) U.S. Cl.
CPC ............ *H01B 7/0216* (2013.01); *C08L 79/08* (2013.01); *C09D 179/08* (2013.01); *H01B 3/306* (2013.01);
(Continued)

(58) Field of Classification Search
CPC .... H01B 13/065; H01B 3/306; H01B 3/308; H01B 7/0216; H01B 7/0233; H01B 7/292; H01F 5/06
USPC ........................................................ 174/12 R
See application file for complete search history.

(56) References Cited

U.S. PATENT DOCUMENTS

| 4,000,362 A | 12/1976 | Kawaguchi et al. |
| 4,537,804 A | 8/1985 | Keane et al. |

(Continued)

FOREIGN PATENT DOCUMENTS

| JP | 36-21623 B1 | 11/1961 |
| JP | 57-11416 A | 1/1982 |

(Continued)

OTHER PUBLICATIONS

International Search Report (Form PCT/ISA/210), issued May 14, 2013, for International Application No. PCT/JP2013/056170.

(Continued)

*Primary Examiner* — Timothy Thompson
*Assistant Examiner* — Paul McGee, III
(74) *Attorney, Agent, or Firm* — Birch, Stewart, Kolasch & Birch, LLP

(57) ABSTRACT

An insulated wire, containing: a conductor; a foamed insulating layer; and an unfoamed filled layer on the outer circumference of the foamed insulating layer, in which the filled layer contains a partial discharge resistant material, which insulated wire has all of high partial discharge inception voltage, resistance to partial discharge, heat resistance, and abrasion resistance (scratch resistance).

10 Claims, 1 Drawing Sheet

(51) Int. Cl.
  *C08L 79/08*  (2006.01)
  *C09D 179/08*  (2006.01)
  *H01F 5/06*  (2006.01)
  *H01B 3/30*  (2006.01)
  *H01B 7/29*  (2006.01)

(52) U.S. Cl.
  CPC ............. *H01B 13/065* (2013.01); *H01B 3/308* (2013.01); *H01B 7/0233* (2013.01); *H01B 7/292* (2013.01); *H01F 5/06* (2013.01)

(56) References Cited

U.S. PATENT DOCUMENTS

| | | | |
|---|---|---|---|
| 6,121,335 A | | 9/2000 | Higashikubo et al. |
| 7,253,357 B2 * | | 8/2007 | Cipelli .................. H01B 3/306 174/110 R |
| 2003/0232144 A1 | | 12/2003 | Kikuchi et al. |
| 2005/0118422 A1 | | 6/2005 | Cipelli et al. |
| 2009/0226720 A1 | | 9/2009 | Kikuchi et al. |
| 2010/0027948 A1 | | 2/2010 | Wasserman et al. |
| 2010/0200268 A1 | | 8/2010 | Suzuki et al. |
| 2010/0224406 A1 | | 9/2010 | Setogawa et al. |
| 2011/0180299 A1 | | 7/2011 | Banerjee et al. |
| 2012/0279752 A1 | | 11/2012 | Oya et al. |
| 2013/0014971 A1 | | 1/2013 | Muto et al. |
| 2013/0236638 A1 | | 9/2013 | Kikuchi et al. |
| 2014/0154407 A1 | | 6/2014 | Kikuchi et al. |

FOREIGN PATENT DOCUMENTS

| | | |
|---|---|---|
| JP | 2-276115 A | 11/1990 |
| JP | 2001-307557 A | 11/2001 |
| JP | 3276665 B2 | 4/2002 |
| JP | 3299552 B2 | 7/2002 |
| JP | 3457543 B2 | 10/2003 |
| JP | 3496636 B2 | 2/2004 |
| JP | 2006-31980 A | 2/2006 |
| JP | 2006-299204 A | 11/2006 |
| JP | 2009-230911 A | 10/2009 |
| JP | 2010-184969 A | 8/2010 |
| JP | 2010-185969 A | 8/2010 |
| JP | 2010-232170 A | 10/2010 |
| JP | 4584014 B2 | 11/2010 |
| KR | 84-1365 B1 | 9/1984 |
| TW | 200604267 A | 2/2006 |
| TW | 200809878 A | 2/2008 |
| TW | 200901232 A | 1/2009 |
| TW | 201129990 A1 | 9/2011 |
| WO | WO 2011/118717 A1 | 9/2011 |
| WO | WO 2011118717 A1 * | 9/2011 ............. H01B 3/301 |
| WO | WO 2011/138934 A1 | 11/2011 |

OTHER PUBLICATIONS

Japanese Office Action, issued Nov. 12, 2013, for Japanese Application No. 2013-535169, with partial English translation.

Chinese Office Action and Search Report and English translation thereof, dated Dec. 3, 2014, for Chinese Applicationa No. 20130001977.9.

Taiwanese Office Action and Search Report, dated Jun. 3, 2015, for Taiwanese Application No. 102108010, along with an English translation thereof.

Korean Office Action, issued Jan. 26, 2016, for corresponding Korean patent application No. 10-2013-7033557, with English translation.

Extended European Search Report, issued Sep. 23, 2015, for European Application No. 13757806.8.

* cited by examiner

INSULATED WIRE, ELECTRICAL EQUIPMENT, AND METHOD OF PRODUCING AN INSULATED WIRE

CROSS-REFERENCE TO RELATED APPLICATIONS

This application is a continuation of PCT/JP2013/056170 filed on Mar. 6, 2013 which claims benefit of Japanese Patent Application No. 2012-051037 filed on Mar. 7, 2012, the subject matters of which are incorporated herein by reference in their entirety.

TECHNICAL FIELD

The present invention relates to an insulated wire, an electrical equipment, and a method of producing an insulated wire.

BACKGROUND ART

Inverters have been employed in many types of electrical equipments, as an efficient variable-speed control unit. Inverters are switched at a frequency of several kHz to tens of kHz, to cause a surge voltage at every pulse thereof. Inverter surge is a phenomenon in which reflection occurs at a breakpoint of impedance, for example, at a starting end, a termination end, or the like of a connected wire in the propagation system, followed by applying a voltage twice as high as the inverter output voltage at the maximum. In particular, an output pulse occurred due to a high-speed switching device, such as an IGBT, is high in steep voltage rise. Accordingly, even if a connection cable is short, the surge voltage is high, and voltage decay due to the connection cable is also low. As a result, a voltage almost twice as high as the inverter output voltage occurs.

As coils for electrical equipments, such as inverter-related equipments, for example, high-speed switching devices, inverter motors, and transformers, insulated wires made of enameled wires are mainly used as magnet wires in the coils. Further, as described above, since a voltage almost twice as high as the inverter output voltage is applied in inverter-related equipments, it is required in insulated wires to have minimized partial discharge deterioration, which is attributable to inverter surge.

In general, partial discharge deterioration is a phenomenon in which an electrical insulating material undergoes, in a complicated manner, for example, molecular chain breakage deterioration caused by collision with charged particles that have been generated by partial discharge of the electrical insulating material (discharge at a portion in which fine void defect exists), sputtering deterioration, thermal fusion or thermal decomposition deterioration caused by local temperature rise, and chemical deterioration caused by ozone generated due to discharge. For this reason, reduction in thickness, for example, is observed in the actual electrical-insulation materials, which have been deteriorated as a result of partial discharge.

In order to prevent deterioration of an insulated wire caused by such partial discharge, insulated wires having improved resistance to corona discharge that is acquired by incorporating particles into an insulating film have been proposed. For example, an insulated wire containing metal oxide microparticles or silicon oxide microparticles incorporated into the insulating film (see Patent Literature 1), and an insulated wire containing silica incorporated into the insulating film (see Patent Literature 2) have been proposed. These insulated wires reduce erosive deterioration caused by corona discharge, by means of the insulating films containing particles. However, these insulated wires having an insulating film containing particles have a problem that a partial discharge inception voltage is decreased, or flexibility of a coating film is decreased.

There is also available a method of obtaining an insulated wire which does not cause partial discharge, that is, an insulated wire having a high partial voltage at which partial discharge occurs. In this regard, a method of making the thickness of the insulating layer of an insulated wire thicker, or using a resin having a low relative dielectric constant in the insulating layer can be considered.

However, when the thickness of the insulating layer is increased, the resultant insulated wire becomes thicker, and as a result, size enlargement of electrical equipments is brought about. This is retrograde to the demand in recent miniaturization of electrical equipments represented by motors and transformers. For example, specifically, it is no exaggeration to say that the performance of a rotator, such as a motor, is determined by how many wires are held in a stator slot. As a result, the ratio (space factor) of the sectional area of conductors to the sectional area of the stator slot, has been required to be particularly highly increased in recent years. Therefore, increasing the thickness of the insulating layer leads to a decrease in the space factor, and this is not desirable when the required performance is taken into consideration.

On the other hand, with respect to the relative dielectric constant of an insulating layer, most of resins that are generally used as a material for the insulating layer have a relative dielectric constant from 3 to 4, and thus there is no resin having a specifically low relative dielectric constant. Furthermore, in practice, a resin having a low relative dielectric constant cannot always be selected necessarily when other properties that are required for the insulating layer (heat resistance, solvent resistance, flexibility and the like) are taken into consideration.

As a means for decreasing the substantial relative dielectric constant of the insulating layer, such a measure is studied as forming the insulating layer from foam, and foamed wires containing a conductor and a foamed insulating layer have been widely used as communication wires. Conventionally, foamed wires obtained by, for example, foaming an olefin-based resin such as polyethylene or a fluorine resin have been well-known. As examples of such foamed wires, foamed polyethylene insulated wires are described in Patent Literature 3, foamed fluorine resin insulated wires are described in Patent Literature 4, the both insulated wires are described in Patent Literature 5.

However, since such a foamed wire has a low heat resistant temperature of the coating film and poor scratch resistance, it is not satisfactory from this point of view.

CITATION LIST

Patent Literatures

Patent Literature 1: Japanese Patent No. 3496636
Patent Literature 2: Japanese Patent No. 4584014
Patent Literature 3: Japanese Patent No. 3299552
Patent Literature 4: Japanese Patent No. 3276665
Patent Literature 5: Japanese Patent No. 3457543

SUMMARY OF INVENTION

Technical Problem

The present invention was achieved in order to solve the problems described above, and the present invention is contemplated for providing an excellent insulated wire having all of high partial discharge inception voltage, resistance to partial discharge, heat resistance and abrasion resistance (scratch resistance), and a method for producing the insulated wire. Further, the present invention is contemplated for providing an electric device using the insulated wire having excellent performance.

Solution to Problem

The above-described problems can be solved by the following means.

(1) An insulated wire, containing:
  a conductor;
  a non-foamed insulating layer obtained by foaming a thermosetting resin; and
  an unfoamed filled layer on the outer circumference of the foamed insulating layer,
  wherein the filled layer contains a partial discharge resistant material in an amount of 30% by mass or less relative to a resin, and
  wherein the foamed insulating layer has a thickness of 30% or more of the sum of the thickness of the foamed insulating layer and the thickness of the filled layer.
(2) The insulated wire as described in item (1), containing the filled layer on the inner circumference of the foamed insulating layer.
(3) The insulated wire as described in item (1) or (2),
  wherein the foamed insulating layer is a layer obtained by laminating plural foamed layers having the filled layer on both or one of the inner circumference and the outer circumference thereof.
(4) The insulated wire as described in item (2) or (3),
  wherein the foamed insulating layer and/or the filled layer on the inner circumference thereof contain the partial discharge resistant material.
(5) The insulated wire as described in any one of items (1) to (4),
  wherein the partial discharge resistant material is titanium dioxide or silica.
(6) The insulated wire as described in any one of items (1) to (5),
  wherein the foamed insulating layer and the filled layer are composed of polyimide or polyamideimide.
(7) The insulated wire as described in any one of items (1) to (6),
  wherein a dielectric constant is 4 or less.
(8) The insulated wire as described in any one of items (1) to (7),
  wherein the foamed insulating layer has an average bubble size of 5 μm or less.
(9) A method of producing the insulated wire as described in any one of items (1) to (8), containing the steps of:
  applying a thermosetting resin varnish on the conductor directly or via the filled layer; and
  baking the thermosetting resin varnish thereby to foam the same during the baking step and form the foamed insulating layer.
(10) An electronic/electrical equipment, using the insulated wire as described in any one of items (1) to (8) in a motor or a transformer.

Advantageous Effects of Invention

According to the present invention, an insulated wire having excellent resistance to partial discharge, partial discharge inception voltage, flexibility and heat resistance can be provided. Further, an insulated wire having excellent characteristics such as described above can be produced.

Other and further features and advantages of the invention will appear more fully from the following description, appropriately referring to the accompanying drawings.

MODE FOR CARRYING OUT THE INVENTION

Figure 1:
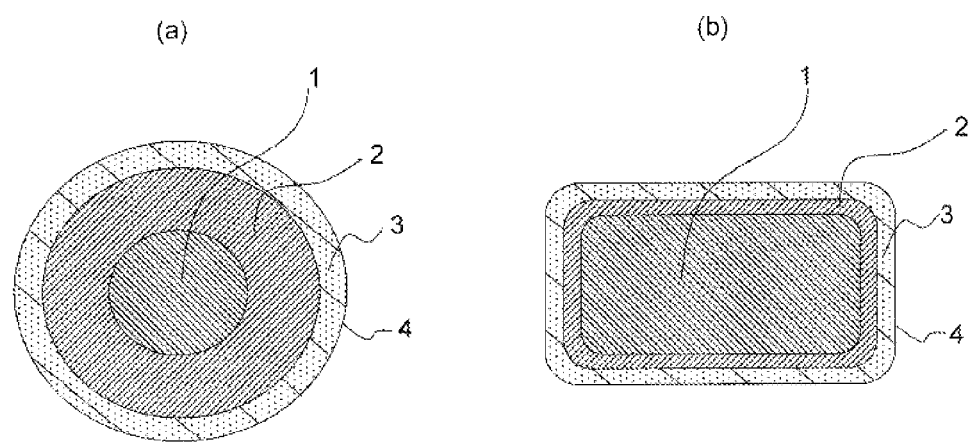
FIG. 1(a) is a cross-sectional view showing an embodiment of the foamed wire of the present invention.
FIG. 1(b) is a cross-sectional view showing another embodiment of the foamed wire of the present invention.

An embodiment of the foamed wire of the present invention will be explained, with reference to the drawings.

The embodiment of the insulated wire of the present invention, as shown in the cross-sectional view in FIG. 1(a), has a conductor 1, a foamed insulating layer 2 covering the conductor 1, and a filled layer 4 containing a partial discharge resistant material 3.

In another embodiment of the insulated wire of the present invention, whose cross-sectional view is shown in FIG. 1(b), the conductor having a rectangular cross-section is used as the conductor 1, and other parts of the configuration are basically the same as the configuration shown in FIG. 1(a). Since the cross-section of the conductor 1 is rectangular, the foamed insulating layer 2 and the filled layer 4 containing the partial discharge resistant material 3 also have rectangular cross-sections.

In still another embodiment of the insulated wire of the present invention, whose cross-sectional view is shown in FIG. 2(a), the configuration of the insulated wire is the same as that shown in FIG. 1(a), except that a filled layer 25 is provided on the outer circumference of the conductor 1 and at the inner side of the foamed insulating layer 2. In still another embodiment of the insulated wire of the present invention shown in FIG. 2(b), the configuration is equivalent to a form in which the foamed insulating layer 2 of FIG. 2(a) is divided into plural layers and laminated, by having a filled layer 26 that is concentric with the foamed insulating layer 2, within the foamed insulating layer 2 provided at the outer side of the conductor 1 having the filled layer 25 provided on the outer circumference. In the present specification, a filled layer means a layer that is not foamed. In the Figures shown above, the same reference symbols respectively mean the same members, and further description will not be repeated herein.

As such, when the insulated wire has a filled layer on both or one of the inner circumference and the outer circumference of the foamed insulating layer, the adhesiveness between the conductor and the insulating layer, and the mechanical strength is increased, which is more preferable. However, in this case, it is preferable that the thickness of the foamed insulating layer be 30% to 90% of the sum of the thickness of the foamed insulating layer and the thickness of the filled layer, so as not to interrupt the effect of decreasing the relative dielectric constant. In a case where the proportion of the thickness of the foamed insulating layer is too low, the resistance to partial discharge is deteriorated. Therefore, the proportion of the thickness is determined in consideration of this.

The partial discharge resistant material refers to an insulating material that is not susceptible to partial discharge deterioration, and a material has an action of enhancing the characteristic of life in charged state by dispersing the material in the insulating film of the wire. Examples thereof include oxides (oxides of metals or non-metal elements), nitrides, glass and mica, and specific examples of the partial discharge resistant material 3 that can be used include microparticles of silica, titanium dioxide, alumina, barium titanate, zinc oxide, and gallium nitride. More preferred examples include silica and titanium dioxide. The grain size of primary particles of the microparticles is preferably 1 μm or less, and more preferably 500 nm or less. There is no limitation on the lower limit, but the lower limit is usually 1 nm.

When the grain size of the partial discharge resistant material is set within the range described above, there is available an operating effect that the life in charged state of the wire is enhanced. In a case where the grain size is too large, the effect of increasing the life in charged state is small, the surface flatness or flexibility of the insulating film is deteriorated, and in a case where the grain size is too small, it is difficult to obtain the effect of micronization by aggregation.

The content of the partial discharge resistant material in the filled layer that is not foamed and is disposed on the outer circumference of the foamed insulating layer is determined from the viewpoint of the intended operating effect. Preferably, the content is 30% by mass or less, and more preferably 20% to 30% by mass, relative to the amount of the resin that constitutes the filled layer. The content is determined so as to obtain an effect that the resistance to partial discharge is increased to a large extent while flexibility is maintained. In a case where the content of the partial discharge resistant material is too large, a problem occurs that flexibility of the insulating film is deteriorated, and in a case where the content is too small, the effect of increasing the life in charged state is decreased.

The insulated wire may have a filled layer on the inner circumference of the foamed insulating layer, or the foamed insulating layer may be configured as a laminate of plural foamed layers each having a filled layer on both or one of the inner circumference and the outer circumference. The partial discharge resistant material may be contained in the foamed insulating layer and/or the filled layer on the inner circumference of the foamed insulating layer. That is, the partial discharge resistant material may be contained in the filled layer on the outer circumference and the filled layer on the inner circumference, or may be contained in the filled layer on the outer circumference and the foamed insulating layer, or may be contained in all of the filled layer on the outer circumference, the filled layer on the inner circumference, and the foamed insulating layer. The amount of the partial discharge resistant material in this case is preferably 5% to 30% relative to the amount of the resin in the foamed insulating layer, and in the filled layer on the inner circumference of the foamed insulating layer, the amount is 30% by mass or less, and more preferably in the range of 20% to 30% by mass, relative to the amount of the resin. From the viewpoints of dielectric constant and flexibility, it is preferable that the partial discharge resistant material be contained only in the filled layers on the inner circumference and the outer circumference, and from the viewpoint of effectively exhibiting the resistance to partial discharge, it is particularly preferable that the partial discharge resistant material be contained only in the filled layer on the outer circumference.

Furthermore, a filled layer containing no partial discharge resistant material may be applied on the further outer circumference of the filled layer on the outer circumference containing the partial discharge resistant material, that is, on the outermost circumference of the insulated wire. An insulated wire configured as such has satisfactory surface flatness and excellent sliding properties. In this case, in order not to damage the resistance to partial discharge and the characteristic of dielectric constant, the thickness of the filled layer containing no partial discharge resistant material on the outermost circumference is preferably 5% to 10% of the overall thickness.

The conductor 1 is made of, for example, copper, a copper alloy, aluminum, an aluminum alloy, or a combination thereof. The cross-sectional shape of the conductor 1 is not limited, and a circular shape, a rectangular shape (perpendicular shape), and the like can be applied.

Materials for preparing the foamed insulating layer 2 is preferably capable of being varnish state material, which can be applied and baked on a conductor thereby to form an insulating film. For example, polyether imide (PEI), polyether sulfone (PES), polyimide (PI), and polyamideimide (PAI) can be used. More preferred examples include polyimide (PI) and polyamideimide (PAI) having excellent solvent resistance. Meanwhile, regarding the resin used, one kind may be used alone, or two or more kinds may be used in mixture.

The foamed insulating layer 2 can be obtained by applying, around the conductor, an insulating varnish obtained by mixing an organic solvent which is a main solvent component of the varnish, two kinds or three or more kinds including at least one kind of a high boiling solvent (as will be described below, three kinds of an organic solvent that dissolves a thermosetting resin, a bubble nucleating agent as a high boiling solvent, and a foaming agent; provided that when the high boiling solvent plays the role of both the bubble nucleating agent and the foaming agent, two kinds), and baking the varnish. The varnish may be applied on the conductor directly or via another resin layer interposed therebetween.

The foamed insulating layer 2 can be obtained by applying, around the conductor, an insulating varnish obtained by mixing three or more kinds of solvents including the particular organic solvent and at least one kind of a high boiling solvent, and baking the varnish. The varnish may be applied on the conductor directly or via another resin layer interposed therebetween.

The organic solvent described above acts as a solvent for dissolving the thermosetting resin. This organic solvent is not particularly limited as long as the organic solvent does not inhibit the reaction of the thermosetting resin, and examples thereof include amide-based solvents such as N-methyl-2-pyrrolidone (NMP), N,N-dimethylacetamide (DMAC), and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; and sulfone-based solvents such as sulfolane. Among these, in view of high solubility, high reaction promotion properties or the like, an amide-series solvent or a urea-series solvent is preferred; and in view of having no hydrogen atom that is apt to inhibit a crosslinking reaction due to heating or the like, N-methyl-2-pyrrolidone, N,N-dimethylacetamide, N,N-dimethylethyleneurea, N,N-dimethylpropyleneurea or tetramethylurea is further preferred, and N-methyl-2-pyrrolidone is particularly preferred. The boiling point of this organic solvent is preferably 160° C. to 250° C., and more preferably 165° C. to 210° C.

The high boiling solvent that can be used for bubble formation is a solvent having a boiling point of preferably 180° C. to 300° C., and more preferably 210° C. to 260° C. Specific examples that can be used for bubble formation include diethylene glycol dimethyl ether, triethylene glycol dimethyl ether, diethylene glycol dibutyl ether, tetraethylene glycol dimethyl ether, and tetraethylene glycol monomethyl ether. From the viewpoint of having a smaller fluctuation in the bubble size, triethylene glycol dimethyl ether is more preferred. Furthermore, the examples that can be used for bubble formation include diethylene glycol dimethyl ether, dipropylene glycol dimethyl ether, diethylene glycol ethyl methyl ether, dipropylene glycol monomethyl ether, diethylene glycol diethyl ether, diethylene glycol monomethyl ether, diethylene glycol butyl methyl ether, tripropylene glycol dimethyl ether, triethylene glycol dimethyl ether, diethylene glycol monobutyl ether, ethylene glycol monophenyl ether, triethylene glycol monomethyl ether, diethylene glycol dibutyl ether, triethylene glycol butyl methyl ether, polyethylene glycol dimethyl ether, tetraethylene glycol dimethyl ether, polyethylene glycol monomethyl ether, and propylene glycol monomethyl ether. Among them, tetraethylene glycol dimethyl ether, diethylene glycol dibutyl ether, triethylene glycol dimethyl ether, diethylene glycol diethyl ether, triethylene glycol monomethyl ether and the like are preferred as a bubble nucleating agent. Preferred combinations of at least two kinds of the high boiling solvents include tetraethylene glycol dimethyl ether with diethylene glycol dibutyl ether, diethylene glycol dibutyl ether with triethylene glycol dimethyl ether, triethylene glycol monomethyl ether with tetraethylene glycol dimethyl ether, and triethylene glycol butyl methyl ether with tetraethylene glycol dimethyl ether. More preferred combinations include diethylene glycol dibutyl ether with triethylene glycol dimethyl ether, and triethylene glycol monomethyl ether with tetraethylene glycol dimethyl ether.

The high boiling solvent for bubble formation needs to have a boiling point higher than that of the solvent for dissolving the thermosetting resin, and in a case where one kind of the high boiling solvent is added to the varnish, it is preferable that the boiling point of the high boiling solvent be higher by 10° C. or more than that of the solvent for dissolving the thermosetting resin. Furthermore, it is understood that in a case where one kind of the high boiling solvent is used, the high boiling solvent takes the role of both a bubble nucleating agent and a foaming agent. On the other hand, in a case where two or more kinds of the high boiling solvents are used, the solvent having the highest boiling point acts as a foaming agent, and a high boiling solvent for bubble formation having a boiling point that is intermediate between the solvent for dissolving the thermosetting resin and the high boiling solvent having the highest boiling point acts as a bubble nucleating agent. The solvent having the highest boiling point preferably has a boiling point that is higher by 20° C. or more, and more preferably by 30° C. to 50° C., than the solvent for dissolving the thermosetting resin. The high boiling solvent for bubble formation having the intermediate boiling point may have a boiling point that is intermediate between the boiling point of the solvent that acts as a foaming agent and the boiling point of the solvent for dissolving the thermosetting resin, and preferably has a difference in boiling point of 10° C. or more from the boiling point of the foaming agent. In a case where the high boiling solvent for bubble formation having the intermediate boiling point has a solubility for the thermosetting resin higher than that of the solvent that acts as a foaming agent, uniform bubbles can be formed after varnish baking.

In the present invention, various additives such as a foam nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer may be incorporated into the raw materials for obtaining the foamed insulating layer, to the extent that the characteristics are not affected. Furthermore, a layer formed from a resin containing these additives may be laminated on the resulting insulated wire, or the insulated wire may be coated with a coating material containing these additives.

The effective relative dielectric constant of the insulated wire is preferably 4.0 or less, further preferably 3.0 or less, so as to obtain an effect of improving a partial discharge inception voltage in the obtained insulated wire. There are no limitations on the lower limit of the relative dielectric constant, but the lower limit is preferably 1.5 or more. The relative dielectric constant can be measured using a commercially available measuring device. The measurement temperature and the measurement frequency can be modified according to the necessity, but unless particularly stated otherwise in the present specification, measurement was made by setting the measurement temperature to 25° C., while setting the measurement frequency to 50 Hz.

In order to realize a necessary relative dielectric constant, the foaming magnification of the foamed insulating layer 2 is preferably 1.2 times or more, and more preferably 1.4 times or more. There are no particular limitations on the upper limit of the foaming magnification, but it is usually preferable to set the foaming magnification to 5.0 times or less. The foaming magnification is obtained by determining the density of a resin coated for foaming ($\rho f$) and the density of the resin before foaming ($\rho s$) by the underwater replacement method, and calculating the foaming magnification from ($\rho s / \rho f$).

The foamed insulating layer 2 has an average bubble size of 5 μm or less, preferably 3 μm or less, and further preferably 1 μm or less. Since the dielectric breakdown voltage is decreased when the average bubble size exceeds 5 μm, the dielectric breakdown voltage can be maintained finely by adjusting the average bubble size to 5 μm or less. Furthermore, the dielectric breakdown voltage can be retained more certainly by adjusting the average bubble size to 3 μm or less. Although the lower limit of the average bubble size is not limited, it is practical and preferable that the lower limit is 1 nm or more. Although the thickness of the foamed insulating layer 2 is not limited, it is practical and preferable that the thickness is from 10 to 200 μm.

Regarding the partial discharge resistant material 3, microparticles of silica, titanium dioxide, alumina, barium titanate, zinc oxide, gallium nitride and the like can be used. More preferred examples include microparticles of silica and titanium dioxide. The grain size of the microparticles is preferably 1 μm or less, and more preferably 500 nm or less.

The filled layer 4 means a layer that does not foam in the present invention. In order to enhance the resistance to partial discharge, the outermost layer of the insulating film contains the partial discharge resistant material 3. The partial discharge resistant material may also be included in other filled layers, or the material may also be included in all of the layers.

EXAMPLES

The present invention will be described in more detail based on examples given below, but the invention is not meant to be limited by these. Meanwhile, in the following Examples, the percent value (%) indicating the composition means percent (%) by mass.

Insulated wires of Examples and Comparative Examples were produced as follows. A polyamideimide varnish used in a foamed insulating layer was obtained by introducing 1,000 g of HI-406 (an NMP solution of 32% by mass of the resin component) (trade name, manufactured by Hitachi Chemical Co., Ltd.) into a separable flask having a capacity of 2 L, and adding 100 g of triethylene glycol monomethyl ether and 150 g of tetraethylene glycol dimethyl ether as bubble forming agents to this solution. For a polyamideimide varnish used in a filled layer, 1,000 g of HI-406 was used. 1,000 g of this polyamideimide varnish was used as a 30 mass % resin solution using NMP as a solvent.

A polyimide varnish used in the foamed insulating layer was obtained by introducing 1,000 g of U-IMIDE (an NMP solution of 25% by mass of the resin component) (manufactured by Unitika, Ltd., trade name) into a separable flask having a capacity of 2 L, and adding 75 g of NMP, 150 g of DMAC, and 200 g of tetraethylene glycol dimethyl ether thereto as solvents. The polyimide varnish used in the filled layer was prepared by using U-IMIDE and adding 250 g of DMAC as a solvent to 1,000 g of the resin.

The various insulating varnishes thus obtained were applied on a copper conductor having a diameter of 1 mmφ and baked at a furnace temperature of 520° C., and thus insulated wires having film thicknesses of 26 μm to 29 μm were obtained. For the insulated wires thus obtained, dimension, dielectric constant, partial discharge inception voltage, life in charged state, heat resistance, and flexibility were evaluated.

Example 1

Figure 2:
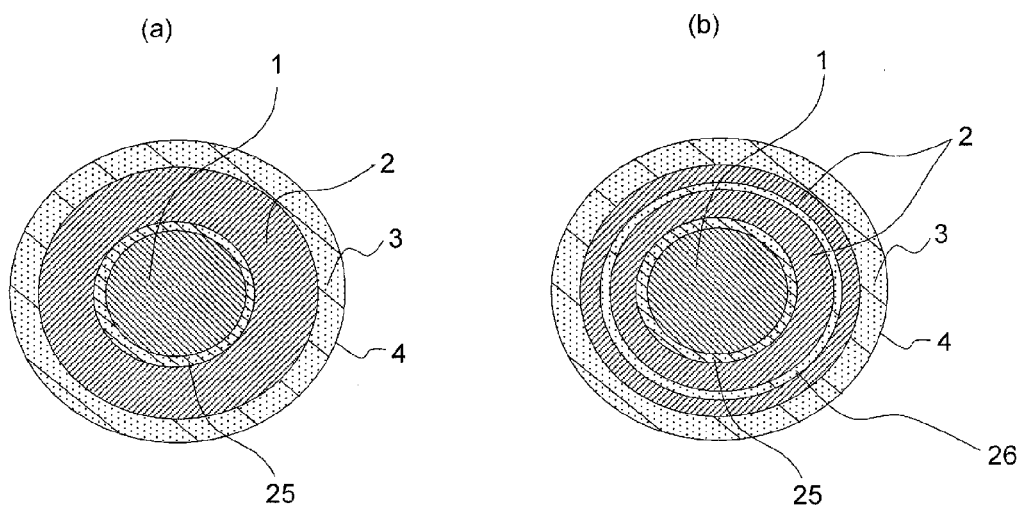
FIG. 2(a) is a cross-sectional view showing further another embodiment of the foamed wire of the present invention.
FIG. 2(b) is a cross-sectional view showing still another embodiment of the foamed wire of the present invention.

An insulated wire (see FIG. 2(*a*)) composed of a foamed polyamideimide layer (thickness: 18 μm), an inner filled layer (4 μm) of polyamideimide, and an outer filled layer (4 μm) containing silica (grain size: 15 nm) at a proportion of 20% in polyamideimide was obtained. The bubble size was 4 μm.

Example 2

An insulated wire (see FIG. 2(*a*)) composed of a foamed polyamideimide layer (thickness: 18 μm), an inner filled layer (4 μm) of polyamideimide, and an outer filled layer (5 μm) containing titanium dioxide (grain size: 15 nm) at a proportion of 20% in polyamideimide was obtained. The bubble size was 4 μm.

Example 3

An insulated wire (see FIG. 2(*a*)) composed of a foamed polyamideimide layer (thickness: 18 μm), an inner filled layer (4 μm) of polyamideimide, and an outer filled layer (4 μm) containing titanium dioxide (grain size: 15 nm) at a proportion of 30% in polyamideimide was obtained. The bubble size was 4 μm.

Example 4

An insulated wire (see FIG. 2(*a*)) composed of a foamed polyamideimide layer (thickness: 10 μm), an inner filled layer (4 μm) of polyamideimide, and an outer filled layer (15 μm) containing titanium dioxide (grain size: 15 nm) at a proportion of 30% in polyamideimide was obtained. The bubble size was 4 μm.

Example 5

An insulated wire (see FIG. 2(*a*)) composed of a foamed polyamideimide layer (thickness: 17 μm), an inner filled layer (4 μm) of polyamideimide, and an outer filled layer (5 μm) containing titanium dioxide (grain size: 15 nm) at a proportion of 30% in polyamideimide was obtained. The bubble size was 2 μm.

Example 6

An insulated wire (see FIG. 2(*a*)) composed of a foamed polyamideimide layer (thickness: 20 μm), an inner filled layer (4 μm) containing titanium dioxide (grain size: 15 nm) at a proportion of 30% in polyamideimide, and an outer filled layer (6 μm) was obtained. The bubble size was 4 μm.

Example 7

An insulated wire (see FIG. 2(*a*)) composed of a foamed polyamideimide layer (thickness: 20 μm) containing titanium dioxide (grain size: 15 nm) at a portion of 30%, an inner filled layer (4 μm) of polyamideimide similarly containing titanium dioxide (grain size: 15 nm) at a proportion of 30%, and an outer filled layer (6 μm) was obtained. The bubble size was 4 μm.

Comparative Example 1

An insulated wire composed of a polyamideimide layer (26 μm) was obtained.

Comparative Example 2

An insulated wire composed of a polyamideimide layer (27 μm) containing silica (grain size: 15 nm) at a proportion of 30% was obtained.

Comparative Example 3

An insulated wire composed of a polyamideimide layer (28 μm) containing titanium dioxide (grain size: 15 nm) at a proportion of 30% was obtained.

Comparative Example 4

An insulated wire composed of a foamed polyamideimide layer (thickness: 18 μm), an inner filled layer of polyamideimide (5 μm), and an outer filled layer of polyamideimide (4 μm) was obtained.

Comparative Example 5

An insulated wire composed of a foamed polyamideimide layer (thickness: 19 μm), an inner filled layer of polyamideimide (4 μm), and an outer filled layer (4 μm) containing titanium dioxide (grain size: 15 nm) at a proportion of 40% in polyamideimide was obtained. The bubble size was 4 μm.

Comparative Example 6

An insulated wire composed of a foamed polyamideimide layer (thickness: 5 μm), an inner filled layer of polyamideimide (4 μm), and an outer filled layer (20 μm) containing titanium dioxide (grain size: 15 nm) at a proportion of 30% in polyamideimide was obtained. The bubble size was 4 μm.

The configurations, properties and evaluation test results of the insulated wires obtained in Examples 1 to 5 and Comparative Examples 1 to 6 are presented in Table 1 and Table 2.

Methods for evaluation are described below.

(Thickness and Average Bubble Size of Foamed Insulating Layer)

The thickness and average bubble size of the foamed insulating layer were determined by observing the cross-sectional surface of the foamed wire with a scanning electron microscope (SEM). The average bubble size is explained in more detail. The diameters of 20 bubbles that were arbitrarily selected from the cross-sectional surface observed with the SEM were determined and the average value thereof was obtained.

[Porosity]

Porosity was obtained by measuring the density of the foamed electrical wire (ρf) and the density of a wire before foaming (ρs) by an underwater replacement method, and calculating the porosity value by the ratio (ρf/ρs).

[Relative Dielectric Constant]

For the relative dielectric constant, the electrostatic capacity of the foamed wire was measured, and the relative dielectric constant obtained from the electrostatic capacity and the thickness of the foamed insulating layer was taken as the measured value. For the measurement of the electrostatic capacity, LCR HITESTER (manufactured by Hioki E.E. Corp., Model 3532-50) was used.

(Partial Discharge Inception Voltage)

Specimens were prepared by combining two wires into a twisted form, an alternating voltage with sine wave 50 Hz was applied between the respective two conductors twisted, and while the voltage was continuously raised, the voltage (effective value) at which the amount of discharged charge was 10 pC was determined. The determination temperature was set at the normal temperature. For the determination of the partial discharge inception voltage, a partial discharge tester (KPD2050, manufactured by Kikusui Electronics Corp.) was used.

[Life in Charged State]

Two wires were twisted with each other, and an alternating voltage of sine wave 10 kHz-1 kVp was applied between the respective conductors and the time t taken until dielectric breakdown occurred was measured. The measurement temperature was normal temperature. A wire having a time to dielectric breakdown of 100 minutes or longer was judged to pass the test criteria.

⊚: 1,000 minutes or more
○: 100 minutes or more and less than 1,000 minutes
X: 100 less than minutes (Heat Resistance)

The wire was left to stand for 500 hours in a high temperature tank at 200° C., and the occurrence or non-occurrence of cracks in the coating film was investigated by visual observation.

○: No crack was observed.
X: Cracks were observed.

(Flexibility)

The occurrence or non-occurrence of cracks in the coating film was investigated with visual observation when each wire was wound 10 times closely around the wire itself such that the wire and the wire would be in contact.

○: No crack was observed.
X: Cracks were observed.

(Grain Size)

The grain size was determined by observation using scanning electron microscope (SEM). The diameters of 20 primary particles arbitrarily selected were measured, and the grain size was defined as the average value of the diameters.

(Bubble Size)

The average bubble size was determined by observing a cross-section of the foamed layer by scanning electron microscopy (SEM). To explain more specifically about the average bubble size, the lengths of arbitrarily selected 20 bubbles in the direction of the insulating layer thickness were measured from a cross-section observed by SEM, and the average bubble size was defined as the average value of the lengths.

[Condition of Baking]

The baking temperatures of the foamed insulating layers and filled layers of various Examples and Comparative Examples are as summarized in the following Tables 1 and 2.

TABLE 1

|  | Ex 1 | Ex 2 | Ex 3 | Ex 4 | Ex 5 | Ex 6 | Ex 7 |
| --- | --- | --- | --- | --- | --- | --- | --- |
| Existent or non-existent of foamed insulating layer | Existent | Existent | Existent | Existent | Existent | Existent | Existent |
| Insulating material | PAI | PAI | PAI | PAI | PI | PAI | PAI |
| Partial discharge resistant material | Silica | Titanium dioxide | Titanium Dioxide | Titanium dioxide | Titanium Dioxide | Titanium Dioxide | Titanium Dioxide |
| Content of the material above (%) | 20 | 20 | 30 | 30 | 30 | 30 | 30 |
| Layer containing the material above | Outer | Outer | Outer | Outer | Outer | Outer and inner | Outer and inner foamed insulating layer |
| Thickness of insulating film (μm) | 26 | 27 | 26 | 29 | 26 | 30 | 30 |
| Thickness of foamed insulating layer (μm) | 18 | 18 | 18 | 10 | 17 | 20 | 20 |
| Thickness of inner filled layer (μm) | 4 | 4 | 4 | 4 | 4 | 4 | 4 |
| Thickness of outer filled layer (μm) | 4 | 5 | 4 | 15 | 5 | 6 | 6 |
| Ratio of thickness of foamed insulating layer (%) | 69 | 67 | 69 | 34 | 66 | 67 | 67 |
| Average bubble size (μm) | 4 | 4 | 4 | 4 | 2 | 4 | 4 |
| Porosity (%) | 42 | 40 | 42 | 21 | 39 | 40 | 40 |
| Relative dielectric constant | 2.3 | 2.4 | 2.4 | 3.5 | 2.3 | 2.5 | 2.6 |

TABLE 1-continued

|  | Ex 1 | Ex 2 | Ex 3 | Ex 4 | Ex 5 | Ex 6 | Ex 7 |
|---|---|---|---|---|---|---|---|
| Partial discharge inception voltage (Vrms) | 670 | 670 | 660 | 600 | 690 | 700 | 690 |
| Life in charged state (minute) | ○ | ○ | ○ | ◎ | ○ | ◎ | ◎ |
| Heat resistance | ○ | ○ | ○ | ○ | ○ | ○ | ○ |
| Flexibility | ○ | ○ | ○ | ○ | ○ | ○ | ○ |

"Ex" means Example according to the present invention.
PAI: Polyamide Imide
PI: Polyimide

TABLE 2

|  | C Ex 1 | C Ex 2 | C Ex 3 | C Ex 4 | C Ex 5 | C Ex 6 |
|---|---|---|---|---|---|---|
| Existent or non-existent of foamed insulating layer | Non-existent | Non-existent | Non-existent | Existent | Existent | Existent |
| Insulating material | PAI | PAI | PAI | PAI | PAI | PAI |
| Partial discharge resistant material | None | Silica | Titanium dioxide | None | Titanium dioxide | Titanium Dioxide |
| Content of the material above (%) | 0 | 30 | 30 | 0 | 40 | 30 |
| Layer containing the material above | — | 26 | All layers | — | Outer layer | Outer layer |
| Thickness of insulating film (μm) | 26 | 27 | 28 | 27 | 27 | 29 |
| Thickness of foamed insulating layer (μm) | None | None | None | 5 | 19 | 4 |
| Thickness of inner filled layer (μm) | None | None | None | 18 | 4 | 5 |
| Thickness of outer filled layer (μm) | None | None | None | 4 | 4 | 20 |
| Ratio of thickness of foamed insulating layer (%) | — | — | — | 67 | 67 | 17 |
| Average bubble size (μm) |  |  |  | 4 | 4 | 4 |
| Porosity (%) | 0 | 0 | 0 | 40 | 42 | 45 |
| Relative dielectric constant | 4.2 | 4.3 | 6.5 | 2.3 | 2.3 | 4.5 |
| Partial discharge inception voltage (Vp) | 540 | 540 | 450 | 700 | 690 | 520 |
| Life in charged state (minute) | X | ◎ | ◎ | X | ◎ | ◎ |
| Heat resistance | ○ | ○ | ○ | ○ | ○ | ○ |
| Flexibility | ○ | ○ | ○ | ○ | X | ○ |

"C Ex" means Comparative Example.
PAI: Polyamide Imide

As can be seen from Table 1, the enameled wires of Examples 1 to 4 each having a foamed insulating layer and a filled layer containing a partial discharge resistant material on the outer circumference of the foamed insulating layer, were acknowledged to have a decrease in the relative dielectric constant caused by foaming, and an improvement in the partial discharge inception voltage. Furthermore, the enameled wires had satisfactory life in charged state, heat resistance and flexibility.

Furthermore, also for the enameled wire of Example 6 having a filled layer containing a partial discharge resistant material both on the inner circumference and the outer circumference, and the enameled wire of Example 7 containing a partial discharge resistant material on all of both the filled layers on the inner circumference and the outer circumference and the foamed insulating layer, a decrease in the relative dielectric constant caused by foaming and an increase in the partial discharge inception voltage were acknowledged similarly, and also, the life in charged state, heat resistance and flexibility were satisfactory.

On the other hand, as can be seen from Table 2, Comparative Example 1 have no foamed insulating layer and no filled layer containing a partial discharge resistant material had poor partial discharge inception voltage and life in charged state. Comparative Examples 2 and 3 that had a filled layer containing a partial discharge resistant material but had no foamed insulating layer, exhibited poor partial discharge inception voltages. Comparative Example 4 that had a foamed insulating layer but had no filled layer containing a partial discharge resistant material, exhibited poor life in charged state. Comparative Example 5 that had a foamed insulating layer and a filled layer containing a partial discharge resistant material but contained the partial discharge resistant material at a content of 40%, exhibited poor flexibility. Comparative Example 6 that had a foamed insulating layer and a filled layer containing a partial discharge resistant material while the proportion of the foamed insulating layer was 17% in terms of the thickness of layers, exhibited poor partial discharge inception voltage.

The insulated wire of the present invention has a cross-sectional surface for which cross-sectional views are shown in FIGS. 1 and 2.

Examples 1 to 5 have cross-sections having a filled layer on the inner side and the outer side of the foamed insulating layer, as shown in the cross-sectional view of FIG. 2(a). The foamed wire of the present invention can be applied to the case where the inner filled layer is not used as shown in the cross-sectional view in FIG. 1(a) and to a rectangular conductor 1 as shown in the cross-sectional view in FIG. 1(b).

The present invention is not construed to be limited by the above-mentioned embodiments, and various modifications can be made within the scope of the technical matter of the present invention.

INDUSTRIAL APPLICABILITY

The present invention can be applied to an automobile, various kinds of electrical/electronic equipments and the like, and fields requiring resistance to voltage and heat resistance. The insulated wire of the present invention can be used in a motor, a transformer and the like, and can provide high performance electrical/electronic equipments. Particularly, the insulated wire of the present invention is favorable as a coil for the driving motors of HV (hybrid vehicles) or EV (electric vehicles).

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2012-051037 filed in Japan on Mar. 7, 2012, which is entirely herein incorporated by reference.

REFERENCE SIGNS LIST

1 Conductor
2 Foamed insulating layer
3 Partial discharge resistant material
4 Filled layer

The invention claimed is:

1. An insulated wire, comprising:
a conductor;
a foamed insulating layer obtained by foaming a thermosetting resin; and
a non-foamed layer on an outer circumference of the foamed insulating layer,
wherein the non-foamed layer contains microparticles of a partial discharge resistant material in an amount of 30% by mass or less relative to a resin, and
wherein the foamed insulating layer has a thickness of 30% or more of the sum of a thickness of the foamed insulating layer and a thickness of the non-foamed layer.

2. The insulated wire according to claim 1, comprising a second non-foamed layer on an inner circumference of the foamed insulating layer.

3. The insulated wire according to claim 1,
wherein the foamed insulating layer is a layer obtained by laminating plural foamed layers having the non-foamed layer on both or one of an inner circumference and the outer circumference thereof.

4. The insulated wire according to claim 2,
wherein the foamed insulating layer and/or the second non-foamed layer on the inner circumference thereof contain the microparticles of a partial discharge resistant material.

5. The insulated wire according to claim 1,
wherein the partial discharge resistant material is titanium dioxide or silica.

6. The insulated wire according to claim 1,
wherein the foamed insulating layer and the non-foamed layer are composed of polyimide or polyamideimide.

7. The insulated wire according to claim 1,
wherein a layer composed of the foamed insulating layer and the non-foamed layer has a relative dielectric constant of 4 or less.

8. The insulated wire according to claim 1,
wherein the foamed insulating layer has an average bubble size of 5 μm or less.

9. A method of producing the insulated wire according to claim 1, comprising the steps of:
applying a thermosetting resin varnish on the conductor directly or via the non-foamed layer; and
baking the thermosetting resin varnish thereby to foam the same during the baking step and form the foamed insulating layer.

10. An electronic/electrical equipment, comprising the insulated wire according to claim 1 in a motor or a transformer.

* * * * *